(12) United States Patent
Lee

(10) Patent No.: US 12,378,040 B2
(45) Date of Patent: Aug. 5, 2025

(54) PRESS-FIT STRUCTURE AND FOOD PACKAGING WRAP USING SAME

(71) Applicant: BDCI CO., LTD., Seoul (KR)

(72) Inventor: Seomin Lee, Seoul (KR)

(73) Assignee: BDCI CO., LTD., Seoul (KR)

(*) Notice: Subject to any disclaimer, the term of this patent is extended or adjusted under 35 U.S.C. 154(b) by 4 days.

(21) Appl. No.: 18/287,814

(22) PCT Filed: Oct. 15, 2021

(86) PCT No.: PCT/KR2021/014410
§ 371 (c)(1),
(2) Date: Oct. 20, 2023

(87) PCT Pub. No.: WO2022/234903
PCT Pub. Date: Nov. 10, 2022

(65) Prior Publication Data
US 2024/0359874 A1   Oct. 31, 2024

(30) Foreign Application Priority Data
May 4, 2021 (KR) .................. 10-2021-0058186

(51) Int. Cl.
*B65D 43/02* (2006.01)
*B65D 43/06* (2006.01)

(52) U.S. Cl.
CPC ......... *B65D 43/0206* (2013.01); *B65D 43/06* (2013.01)

(58) Field of Classification Search
CPC ............ B65D 43/0206; B65D 43/0204; B65D 43/0202; B65D 43/06; A47G 19/02; A47G 19/00
(Continued)

(56) References Cited

U.S. PATENT DOCUMENTS

2003/0197021 A1* 10/2003 Chou .................. B65D 43/021
                                                                220/4.24
2005/0269319 A1* 12/2005 Tang .................. B65D 21/0219
                                                                220/366.1
(Continued)

FOREIGN PATENT DOCUMENTS

EP          0510797 A1    10/1992
JP       H05-137606 A      6/1993
(Continued)

OTHER PUBLICATIONS

BDCI Co., Ltd, "[No More Disposable Plates!] Lightweight, Safe Reusable Silicone Plates", WADIZ, Oct. 27, 2020, Retrieved on Jan. 5, 2022, Retrieved from< https://www.wadiz.kr/web/campaign/detail/87088>.

*Primary Examiner* — Robert J Hicks
(74) *Attorney, Agent, or Firm* — Bridgeway IP Law Group, PLLC; Jihun Kim

(57) ABSTRACT

Proposed is a press-fit structure for sealing fastened portions while detachably fastening a first member and a second member to each other, the improved press-fit structure including: a male seal formed to protrude to a predetermined length on the first member, a female seal formed on the second member in a groove shape corresponding to the length of the male seal, and configured such that the male seal is press-fitted thereinto; and air discharge portions formed in portions of the male seal, and configured to provide discharge paths for air inside the female seal during the process of press-fitting the male seal.

14 Claims, 6 Drawing Sheets

(58) Field of Classification Search
USPC ............................... 220/783, 780, 575, 574
See application file for complete search history.

(56) References Cited

U.S. PATENT DOCUMENTS

| | | | |
|---|---|---|---|
| 2006/0000842 A1* | 1/2006 | Maxwell | B65D 81/3453 |
| | | | 220/780 |
| 2009/0022435 A1 | 1/2009 | Tanaka et al. | |
| 2010/0158416 A1 | 6/2010 | Ichikawa et al. | |
| 2012/0240364 A1 | 9/2012 | Voigt | |
| 2013/0200092 A1 | 8/2013 | Kim et al. | |

FOREIGN PATENT DOCUMENTS

| | | |
|---|---|---|
| JP | 5377858 B2 | 12/2013 |
| KR | 20-0310675 Y1 | 4/2003 |
| KR | 20-0467452 Y1 | 6/2013 |
| KR | 10-2013-0090672 A | 8/2013 |
| KR | 10-1313079 B1 | 10/2013 |
| KR | 10-1318714 B1 | 10/2013 |
| KR | 10-1354305 B1 | 1/2014 |
| KR | 20-2017-0003065 U | 8/2017 |
| KR | 10-2186358 B1 | 12/2020 |
| KR | 10-2286368 B1 | 8/2021 |

\* cited by examiner

PRESS-FIT STRUCTURE AND FOOD PACKAGING WRAP USING SAME

TECHNICAL FIELD

The embodiments disclosed herein relate to an improved press-fit structure and a food packaging wrap, and more particularly, to an improved press-fit structure capable of sealing fastened portions through a male seal that is press-fitted into a female seal and a food packaging wrap using the same.

BACKGROUND ART

Typically, wraps are used to package food in a sealed state to minimize deterioration during storage.

As disclosed in Korean Utility Model Registration No. 20-0310675, a typical wrap is made of film material and is mainly used to seal the opening of a container containing food. This wrap is used as a disposable product that is discarded when removed from the container.

The conventional wrap described above is also used by a method of packaging food by wrapping the food with the wrap itself. In this case, the wrap is attached to itself and is difficult to separate, so that there is the inconvenience of having to tear the wrap to separate attached portions.

Furthermore, the conventional wrap is used as a disposable product and is discarded, so that there is a problem in that it cannot be reused.

Furthermore, the conventional wrap is suitable for use with a food container, but there are limitations in packaging food without using a container.

Meanwhile, in zipper bags, which are mainly used for the sealed packaging of food, the entrance of a bag is sealed through a press-fit structure called a zipper lock.

More specifically, a typical press-fit structure is a structure in which a male member formed in a protrusion shape is press-fitted into a female member formed in a groove shape and performs sealing while being coupled to the female member.

However, the conventional press-fit structure has the problem of incomplete fastening as the male member is gradually pushed during the process of being press-fitted. Accordingly, there is the inconvenience of having to fasten the male member by slowly pressing it from one end thereof, and it is significantly difficult to fasten the male member from the middle thereof.

In particular, the conventional press-fit structure has the problem of incomplete fastening because the air inside the female member cannot be discharged and pushes the male member during the process of press-fitting the male member.

Therefore, there is a demand for new technology for overcoming the above-described limitations of the prior art.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

An object of the embodiments disclosed herein is to propose an improved press-fit structure by which fastened portions may be sealed by fastening two members through a male seal that is press-fitted into a female seal and, in particular, the male seal may be easily press-fitted as the air inside the female seal is discharged during the process of press-fitting the male seal.

Another object of the embodiments disclosed herein is to propose an improved press-fit structure that may strengthen the fastening force of a male seal that is press-fitted into a female seal.

Another object of the embodiments disclosed herein is to propose a food packaging wrap in which an improved press-fit structure is applied to a wrap main body, so that food can be easily packaged in a sealed state without a container containing the food and folded portions can be securely sealed when the wrap main body is folded.

Technical Solution

As a technical solution for overcoming the above-described technical problem, according to an embodiment of an improved press-fit structure, there is provided a press-fit structure for sealing fastened portions while detachably fastening a first member and a second member to each other, the improved press-fit structure including: a male seal formed to protrude to a predetermined length on the first member; a female seal formed on the second member in a groove shape corresponding to the length of the male seal, and configured such that the male seal is press-fitted thereinto; and air discharge portions formed in portions of the male seal, and configured to provide discharge paths for air inside the female seal during the process of press-fitting the male seal.

Furthermore, the male seal may include: a male base formed to protrude from the first member while forming a width narrower than the width of a groove constituting a portion of the female seal; and one or more male blades formed to protrude on at least one of both sides in the widthwise direction of the male base while forming blade shapes having a width corresponding to the width of the groove constituting a portion the female seal, and configured to come into close contact with side walls that form the groove of the female seal; and the air discharge portions may include: one or more air discharge recesses formed in recess shapes in portions of the male blades so that a width of the male blades is narrowed, and configured to form one or more air discharge paths between the side walls that form the groove of the female seal.

Furthermore, the male blades may be formed to protrude on both sides in the widthwise direction of the male base; and the air discharge recesses may be formed on the male blades on both sides of the male base and be symmetrical with respect to the male base.

Furthermore, the male blades may be formed to protrude on both sides in the widthwise direction of the male base; and the air discharge recesses may be formed on the male blades on both sides of the male base and be asymmetrical with respect to the male base.

Furthermore, the female seal may include: a pair of female side walls formed to extend in a state of being spaced apart at a predetermined interval to form the groove in a space, and configured to come into close contact with the male blades; and side wall hooks formed to protrude from the pair of female side walls, and configured to be caught on the male blades.

Furthermore, the male seal may extend while forming a curvature different from the curvature of the female seal.

Furthermore, the male seal may extend while forming the curvature of an arch or wave shape repeated a plurality of times.

As a technical solution for overcoming the above-described technical problem, according to an embodiment of a food packaging wrap having an improved press-fit structure, there is provided a food packaging wrap for packaging food in a sealed state, the food packaging wrap including: a wrap main body formed of a soft plate having a predetermined area and elasticity, allowed to be folded, and configured to be folded while accommodating food or to surround food while being combined with another plate; a male seal formed to protrude along the circumference of one half of the circumference of one surface of the wrap main body; a female seal formed in a groove shape along the circumference of the other half of the circumference of the one surface of the wrap main body, and configured such that the male seal is press-fitted and coupled thereto by the folding of the wrap main body, or a female seal formed in another wrap main body is press-fitted and coupled thereto; and air discharge portions formed in portions of the male seal, and configured to provide discharge paths for air inside the female seal during a process of press-fitting the male seal.

Advantageous Effects

According to one of the above-described solutions, there may be proposed the improved press-fit structure that may easily and completely seal fastened portions through the press-fit fastening of the male seal and the female seal.

In particular, during the process of press-fitting the male seal, the internal air of the female seal is discharged through the air discharge portions, so that the male seal can be fastened smoothly and completely without being pushed. Since the male seal is prevented from being pushed, the male seal may be fastened in place no matter where the press-fitting of the male seal begins.

Furthermore, the male seal is formed with a curvature different from the curvature of the female seal and is fastened in the state of being deformed to fit the female seal during the process of being press-fitted into the female seal, so that the male seal can come into close contact with the female seal by means of restoring force, thereby strengthening fastening force.

Furthermore, when the improved fastening structure according to any one of the above-described solutions is applied to the food packaging wrap, food can be sealed and stored through the fastening of the male seal and the female seal in the state in which the wrap main body is folded, and the male seal and the female seal are formed to protrude from the wrap main body rather than being bonded to the wrap main body, thereby providing a structure that is simple and easy to clean.

Moreover, when the wrap main body is folded for food packaging, the sealing blocks constituting portions of the foldable sealing portions come into close contact with the inclined sealing surfaces, so that the folded portions can be securely sealed, and the block protrusions protruding from the sealing blocks are fitted into and caught on the protrusion holders, so that the sealing blocks can be securely sealed.

The effects that can be obtained by the embodiments disclosed herein are not limited to the above-described effects, and other effects that have not been described above will be clearly understood by a person having ordinary skill in the art, to which the present invention pertains, from the following description.

MODE FOR INVENTION

Figure 1:
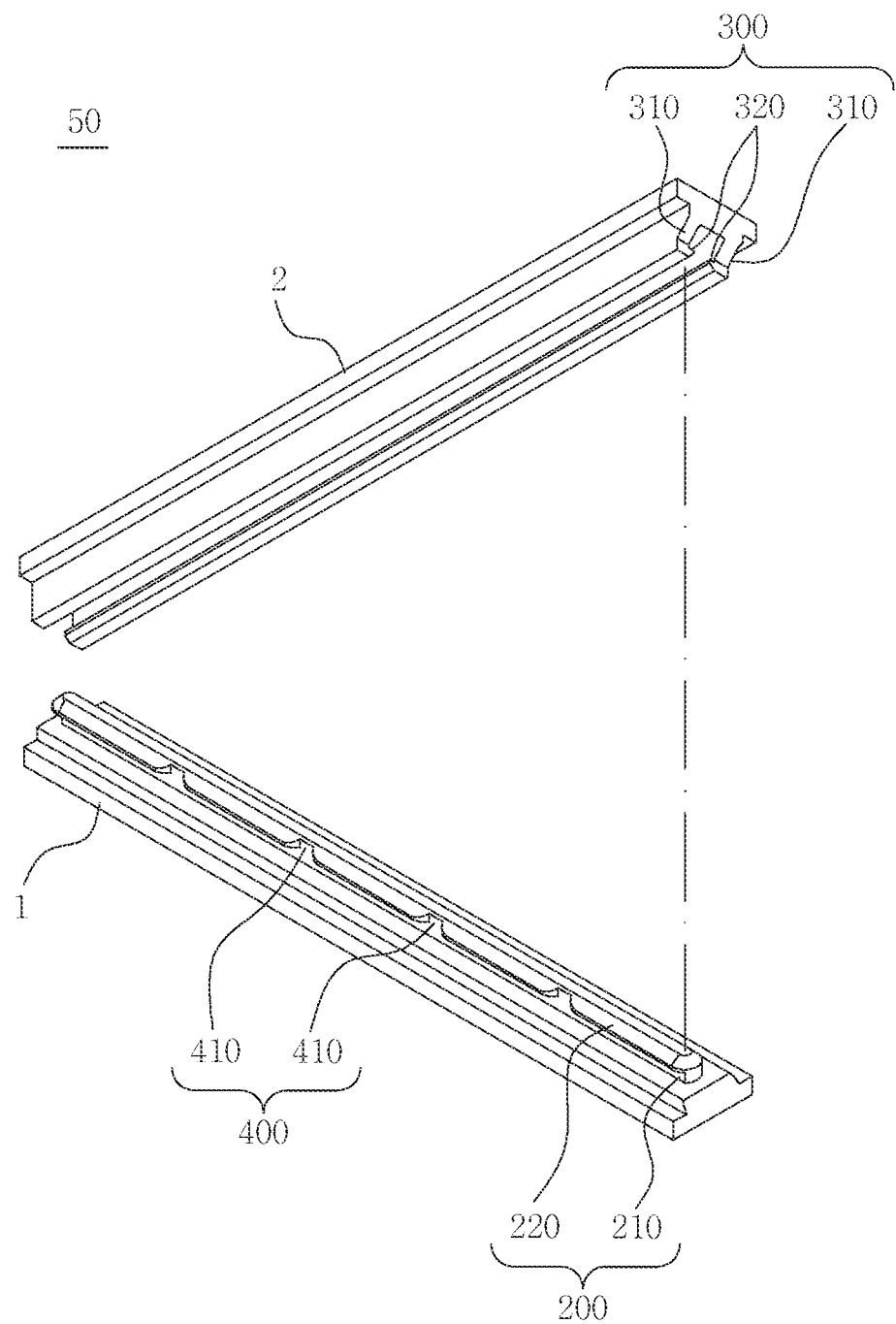
FIG. 1 is a perspective view showing a press-fit structure according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being 'connected' to another component, this includes not only a case where the one component is 'directly connected' to the other component but also a case where the one component is 'connected to the other component with a third component arranged therebetween.' Furthermore, when one portion is described as 'including' one component, this does not mean that the portion does not exclude another component but means that the portion may further include another component, unless explicitly described to the contrary.

Embodiments of the present invention will be described in detail below with reference to the accompanying drawings.

Figure 2:
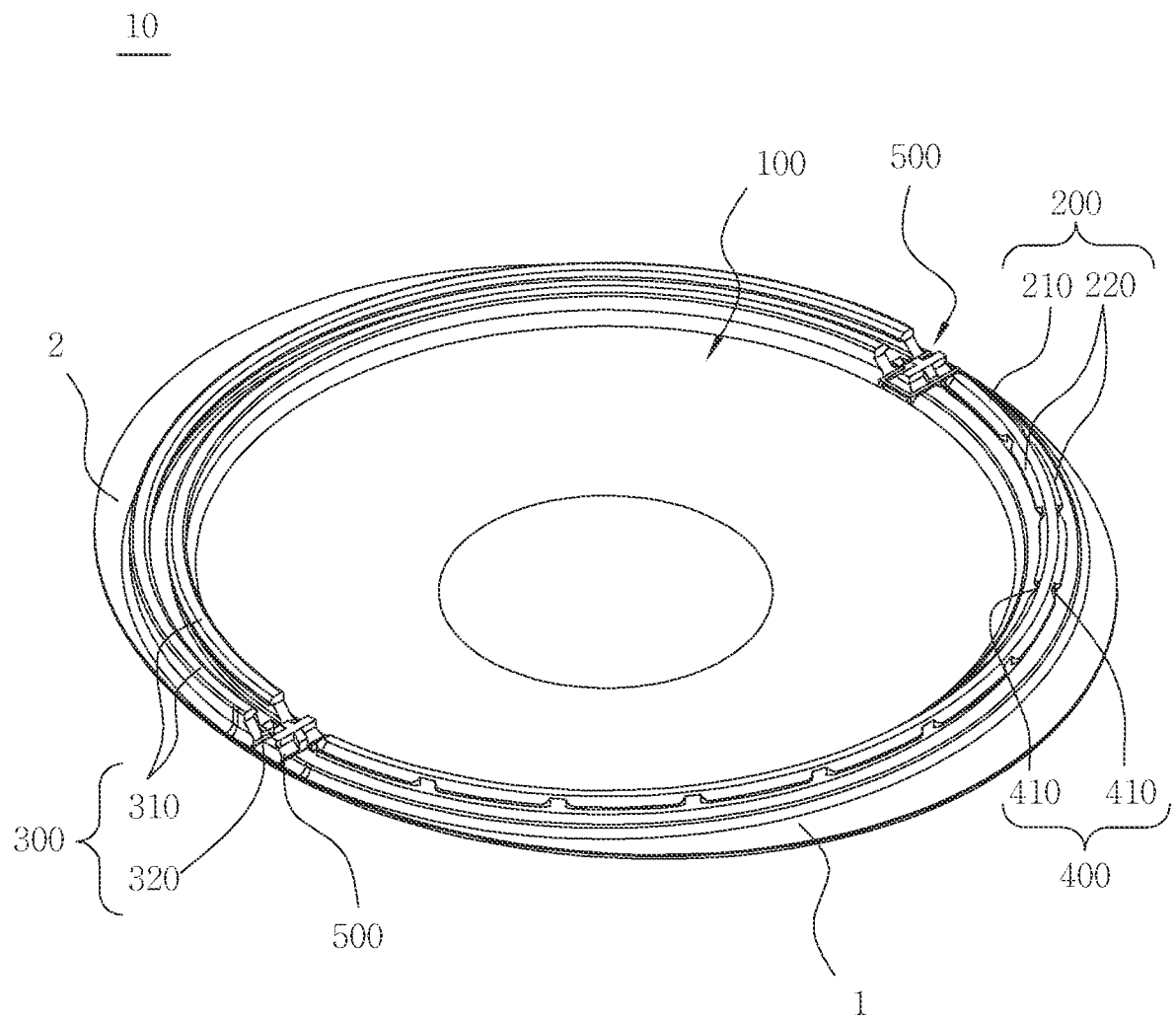
FIG. 2 is a perspective view showing a food packaging wrap having an improved press-fit structure according to an embodiment.
Figure 3:
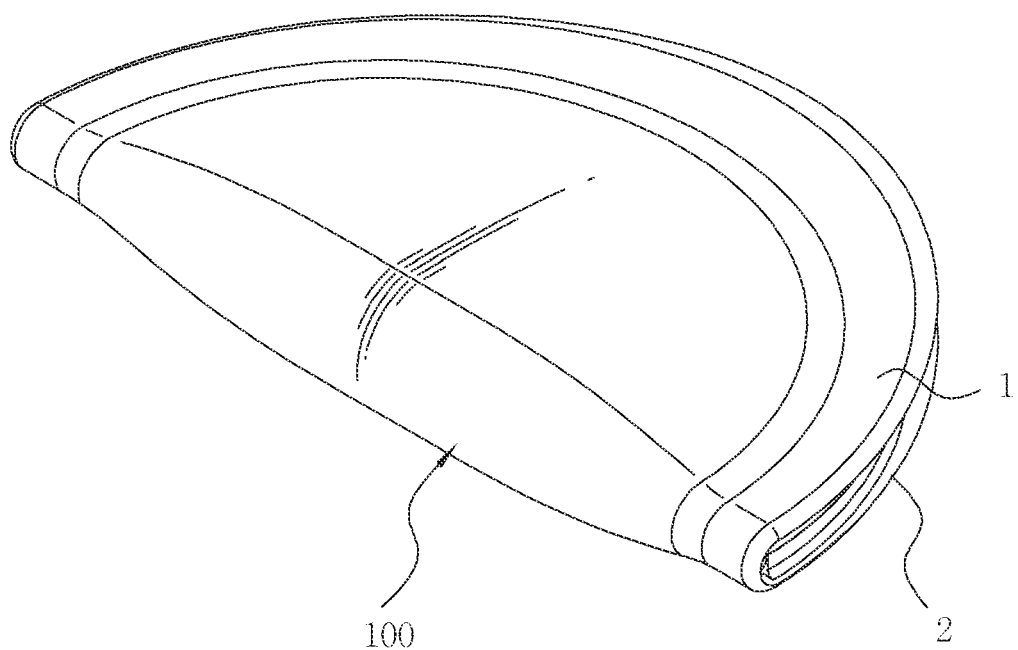
FIG. 3 is a perspective view showing a use state of a food packaging wrap having an improved press-fit structure according to an embodiment.
Figure 4:
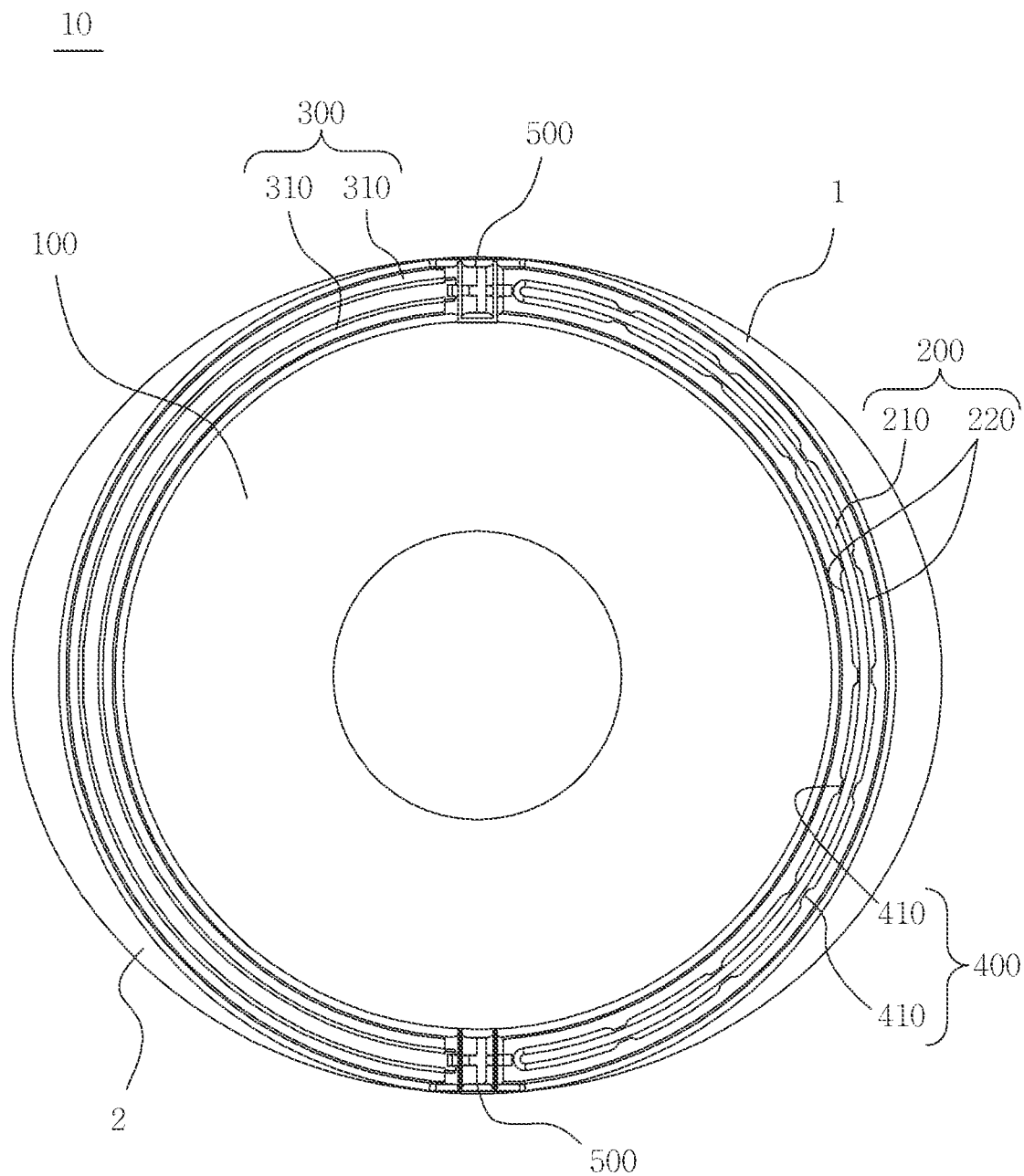
FIG. 4 is a front view showing a food packaging wrap having an improved press-fit structure according to an embodiment.
Figure 5:
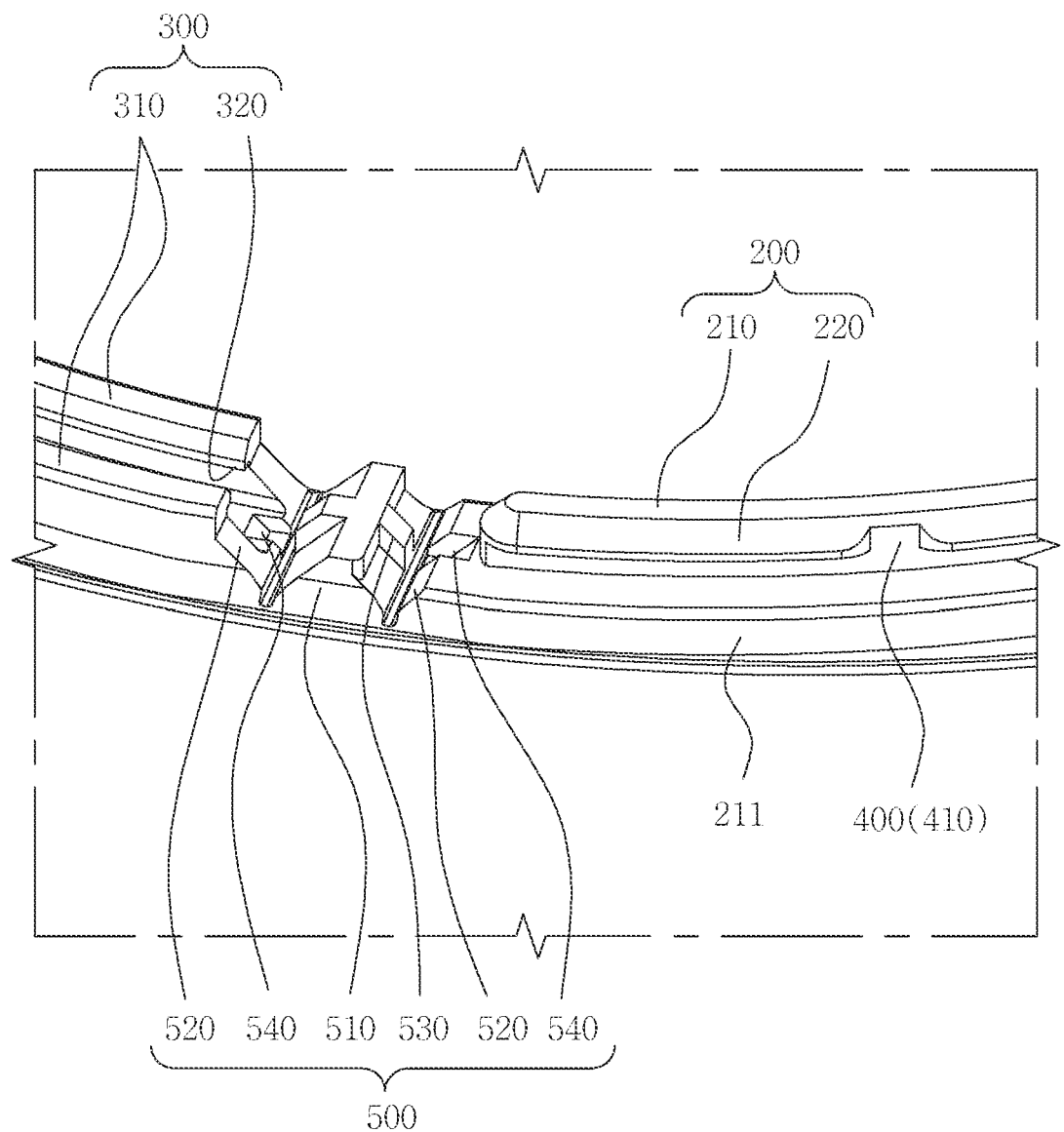
FIG. 5 is an enlarged perspective view showing the main part of a food packaging wrap having an improved press-fit structure according to an embodiment.
Figure 6:
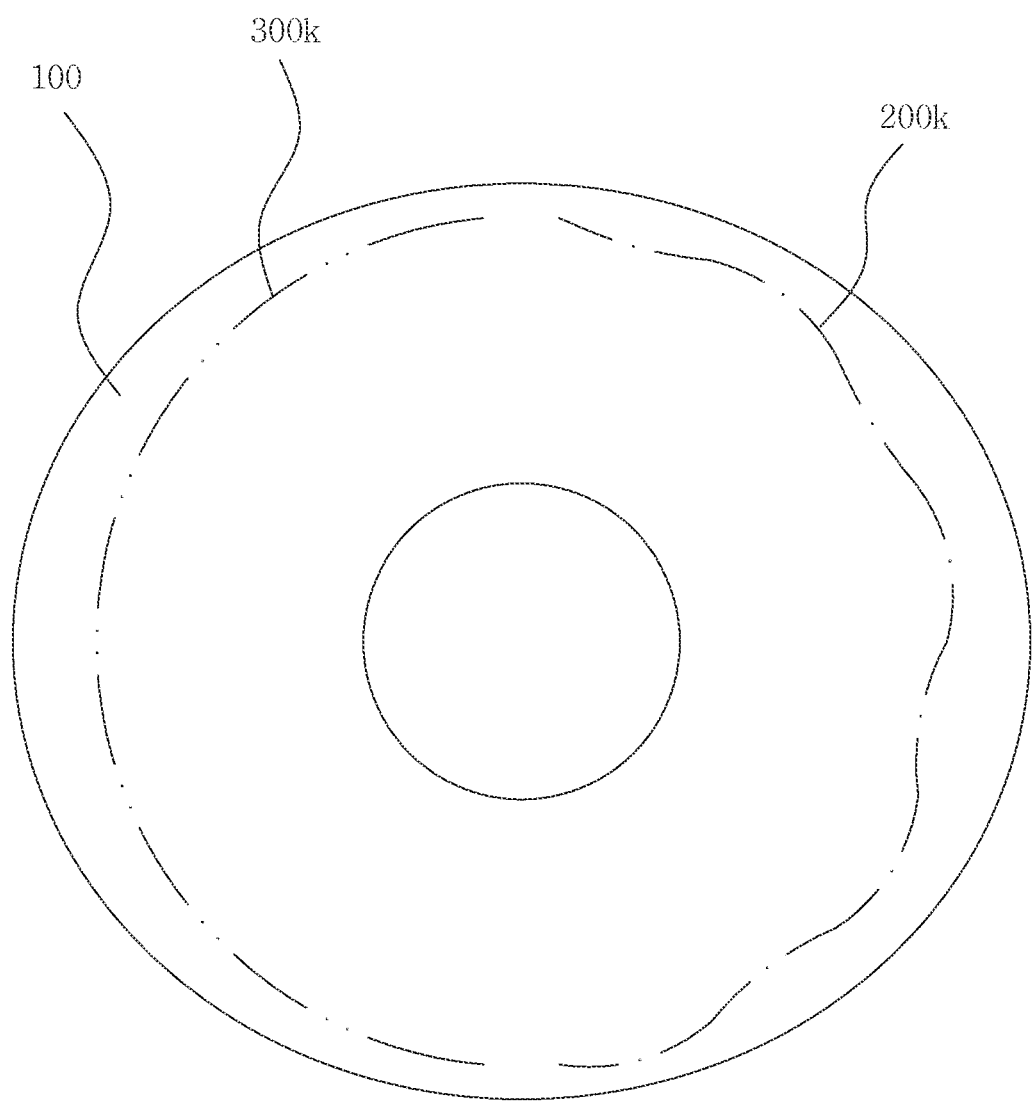
FIG. 6 is a configuration diagram showing the curvature of a male seal.

FIG. 1 is a perspective view showing an improved press-fit structure according to an embodiment, FIG. 2 is a perspective view showing a food packaging wrap having an improved press-fit structure according to an embodiment, FIG. 3 is a perspective view showing a use state, and FIG. 4 is a front view. Furthermore, FIG. 5 is an enlarged perspective view showing the main part of the food packaging wrap, and FIG. 6 is a configuration diagram showing the curvature of the male seal.

As shown in FIG. 1, an improved press-fit structure 50 according to an embodiment is a male-female fastening structure for sealing fastened portions while detachably fastening a first member 1 and a second member 2 to each other. The improved press-fit structure 50 may be configured to include a male seal 200, a female seal 300, and an air discharge part 400.

In this case, the first member 1 and second member 2 to which the improved press-fit structure 50 according to an embodiment can be applied may be any type of components that can be sealed while being fastened to each other.

For example, the first member 1 and the second member 2 are composed of a container and a lid, respectively, that form a set, one of the male seal 200 and the female seal 300, which will be described later, is formed along the circumference of the container, and the remaining one of the male seal 200 and the female seal 300 may be formed along the circumference of the lid.

Alternatively, the first member 1 and the second member 2 are composed of both ends, respectively, that face each other while forming the opening of a packaging bag, and the male seal 200 and the female seal 300, which will be described later, may be formed on them, respectively.

In particular, the improved press-fit structure 50 according to an embodiment may be applied to a wrap main body 100 that can be folded while forming a single body, as shown in FIG. 2. In this case, the second member 1 and the second member 2 may be formed on both sides of the circumference of the wrap main body 100, respectively.

More specifically, the first member 1 may be composed of one half of the circumference of one side of the wrap main body 100, and the second member 2 may be composed of the other half of the circumference of the one side of the wrap main body 100.

A case where the first member 1 and second member 2 to which the improved press-fit structure 50 according to an embodiment is applied are composed of respective halves of the wrap main body 100 will be described as an embodiment below.

More specifically, the wrap main body 100 is a component that directly wraps and packages food.

More specifically, the wrap main body 100 is formed of a soft plate having a predetermined area and elasticity, so that it can be stretched while surrounding food through folding. As shown in FIG. 3, the wrap main body 100 may be folded in the state of accommodating food or may wrap and package food while being superimposed on another wrap main body.

This wrap main body 100 may be formed of a plate made of an elastic plastic material called elastomer, and may be made of a transparent or opaque material.

The wrap main body 100 may be formed in a circular shape as shown in FIG. 2, but is not limited thereto. The wrap main body 100 may be formed as a rectangular or polygonal plate.

Furthermore, the wrap main body 100 may be provided with reinforcing protrusions (not shown) on the surface thereof.

These reinforcing protrusions are formed in a predetermined pattern while being embossed or engraved on the surface of the wrap main body 100, and prevent the wrap main body 100 from sagging due to the weight of food by reinforcing the rigidity of the wrap main body 100.

The male seal 200 is formed to protrude to a predetermined length from the first one 1 of the first member 1 and the second member 2. The male seal 200 is a component that fastens and seals the circumference of the wrap main body 100 along with the female seal 300 in such a manner that it is formed to protrude along the circumference of one half of the circumference of one surface of the wrap main body 100 forming the first member 1 and is press-fitted into the groove of the female seal 300 to be described later, as shown in FIG. 2.

This male seal 200 may be configured to include a male base 210 and one or more male blades 220, as shown in FIGS. 1 and 5.

The male base 210 is a component that supports the male blades 220 to be described later. The male base 210 may protrude along the circumference of one half of one side of the wrap main body 100 while forming a width narrower than the width of the groove constituting a portion of the female seal 300 to be described later.

This male base 210 may protrude from the top of a stepped portion 211 that is raised on the surface of the wrap main body 100 as shown in FIG. 5, and may be formed to protrude directly from the surface of the wrap main body 100 as the component of the stepped portion 211 is omitted.

The male blades 220 are components that are press-fitted into the groove of the female seal 300 to be described later and come into close contact with the side walls of the female seal 300 forming the groove of the female seal 300, thereby fastening the circumference of the wrap main body 100 in a sealed state.

More specifically, the male blades 220 are formed to protrude on one or more of both sides in the widthwise direction of the male base 210 while forming a blade shape having a width corresponding to the width of the groove of the female seal 300 to be described later, and may come into close contact with the side walls of the groove constituting a portion of the female seal 300.

The male blades 220 may be formed to protrude on both sides in the width direction of the male base 210, as shown in FIG. 4. In contrast, a male blade 220 may protrude only on one side of the male base 210 and form a width corresponding to the width of the groove of the female seal 300.

The female seal 300 is formed in a groove shape in the second one 2 of the first member 1 and the second member 2, and is coupled with the male seal 200 in a press-fitted manner. The female seal 300 is formed in a groove shape along the circumference of the other half of the circumference of the one surface of the wrap main body 100 forming the second member 2, and allows the above-described male seal 200 to be press-fitted and fastened thereto.

In other words, the female seal 300 is formed in a groove shape at a position symmetrical to the position of the male seal 200, so that it can be fastened to the male seal 200 by the folding of the wrap main body 100. The female seal 300 may seal fastened portions while being fastened to the male seal 200 formed in another wrap main body 100.

Accordingly, when the wrap main body 100 is folded in the state of accommodating food, the male seal 200 and the female seal 300 may be coupled to each other while wrapping the food. Alternatively, when the wrap main body 100 packages food in the state of being superimposed on another wrap main body 100, the male seal 200 and the female seal 300 may be coupled to the male seal 200 and female seal 300 of the other wrap main body 100.

In this case, the female seal 300 may be configured to include a pair of female side walls 310 and side wall hooks 320, as shown in FIG. 5.

The pair of female side walls 310 are components that form a groove into which the above-described male seal 200 can be press-fitted, are spaced apart at a predetermined interval and form a groove in a space, and may extend along the circumference of one half of the wrap main body 100.

In other words, the male blades 220 constituting portions of the male seal 200 are pressed into and come into close contact with the space between the pair of female side walls 310, so that the pair of female side walls 310 fasten the circumference of the wrap main body 100 in a sealed state along with the male blades 220.

The side wall hooks 320 are components that are caught on the male blades 220 and fix the male blades 220 to the female side walls 310, and protrude from the pair of female side walls 310, respectively, in the form of facing each other.

In other words, the male blades 220 may be fixed without being unintentionally separated from the female side walls 310 by being press-fitted into the space between the pair of female side walls 310 and caught on the side wall hooks 320.

The air discharge part 400 is a component that allows the male seal 200 to be completely press-fitted and fastened by providing discharge paths for air inside the space between the female side walls 310 constituting portions of the female seal 300.

In other words, the air discharge part 400 is a component that is configured to allow the internal air of the female side walls 310 to be discharged during the process of press-fitting the male seal 200, thereby allowing the male seal 200 to be completely press-fitted without being pushed.

This air discharge part 400 may be configured to include air discharge recesses 410, as shown in FIGS. 1 and 2.

More specifically, the air discharge recesses 410 are formed in recess shapes in portions of the male blades 220 so that the width of the male blades 220 is narrowed to form air paths between the female side walls 310, so that the air inside the female side walls 310 can be discharged.

In this case, the air discharge recesses 410 may include a plurality of recesses formed along the longitudinal direction of each of the male blades 220, as shown in FIG. 4. The air discharge recesses 410 may be formed on each of the male blades 220 protruding on both sides in the widthwise direction of the male base 210.

In this case, the air discharge recesses 410 may be formed symmetrically with respect to the male base 210, or may be formed asymmetrically.

Meanwhile, the male seal 200 and the female seal 300 may extend while forming the same curvature, as in the case of extending in the same straight line as shown in FIG. 1 or extending in an arc shape at the same angle as shown in FIG. 4.

In contrast, the male seal 200 may extend while forming a curvature different from that of the female seal 300.

Referring to FIG. 6, reference numeral 200$k$ denotes the curvature of the male seal 200, and reference numeral 300$k$ denotes the curvature of the female seal 300.

In other words, the female seal 300 may be formed to extend with an arc-shaped curvature (300$k$) corresponding to the circumference of the half portion of the wrap main body 00. The male seal 200 may extend along the circumference of the half portion of the wrap main body 100 while forming a curvature (200$k$) of a wave shape that repeatedly protrudes a plurality of times in the left and right directions.

In addition, unlike the male seal 200 shown in FIG. 6, the male seal 200 may extend while forming a curvature of an arch shape that repeatedly protrudes a plurality of times only in one of the left and right directions.

Accordingly, the male seal 200 may be press-fitted into the female seal 300 in the state of being deformed to fit the curvature (200$k$) of the female seal 200, and may be brought into close contact with the female seal 200 because restoring force is applied in the press-fitted state.

It is obvious that, even when the female seal 300 extends in a straight line as shown in FIG. 1, the male seal 200 may extend while forming a curvature of a wave or arch shape repeated a plurality of times.

Meanwhile, a binding part 200 according to an embodiment may be configured to further include foldable sealing portions 500, as shown in FIGS. 4 and 5.

The foldable sealing portions 500 are components that are provided in the boundary portions between the male seal 200 and the female seal 300 and seal folded portions when the wrap main body 100 is folded.

In other words, the foldable sealing portions 500 are components that seal folded portions when food is packaged by the folding of the wrap main body 100, thereby preventing outside air from entering the folded portions or preventing food from flowing out of the folded portions.

As shown in FIG. 5, each of the foldable sealing portions 500 may be configured to include a sealing block 510, inclined sealing surfaces 520, block protrusions 530, and protrusion holders 540.

The sealing block 510 may be formed to protrude from a portion of the surface of the wrap main body 100 forming the boundary portion between the male seal 200 and the female seal 300 while forming a trapezoidal section.

In other words, the sealing block 510 may be formed to protrude from the surface of the wrap main body 100 in a trapezoidal sectional shape whose width gradually becomes narrower toward the top.

The inclined sealing surfaces 520 are components that, when the wrap main body 100 is folded, come into close contact with the sealing block 510 and seal the folded portions along with the sealing block 510, and may be formed as inclined surfaces at the ends of the male seal 200 and the female seal 300.

In other words, the inclined sealing surfaces 520 are formed as inclined surfaces corresponding to the trapezoidal section of the sealing block 510, so that they can come into close contact with the sealing block 510 when the wrap main body 100 is folded.

The block protrusions 530 are components for accurately positioning and fixing the sealing block 510 onto the inclined sealing surfaces 520 when the wrap main body 100 is folded.

More specifically, the block protrusions 530 may be formed to protrude from the top of the sealing block 510 and provide catch portions.

The protrusion holders 540 are formed in recess shapes in the inclined sealing surfaces 520 of the male seal 200 and the female seal 300, respectively, and may accommodate the block protrusions 530 when the wrap main body 100 is folded.

In other words, the block protrusions 530 are inserted into and caught on the protrusion holders 540 when the wrap main body 100 is folded, thereby accurately positioning the sealing block 510 on the inclined sealing surfaces 520.

A method of using a food packaging wrap 10 having an improved press-fit structure 50 according to an embodiment, including the above components, will be described.

When food is packaged, a user may package the food by press-fitting the male seal 200 into the female seal 300 while folding the wrap main body 100 in the state of placing the food on the top surface of the wrap main body 100.

More specifically, the male blades 220 constituting portions of the male seal 200 may be press-fitted and fastened between the pair of female side walls 310 constituting portions of the female seal 300.

In this case, the air discharge recesses 410 may discharge the air inside the female side walls 310 to the outside during the process of press-fitting the male blades 220. Accordingly, the male blades 220 may be press-fitted smoothly without being pushed in the longitudinal direction during the press-fitting process and securely come into close contact with the female side walls 310.

Furthermore, when the male seal 200 is formed with a curvature of an arch or wave shape, it may be deformed and press-fitted with a curvature corresponding to the curvature of the female seal 300. As restoring force is applied in a press-fitted state, the male seal 200 may be more securely fastened to the female seal 300 while coming into close contact with the female seal 300.

In this case, the sealing block 510 may seal the folded portions of the wrap main body 100 while coming into close contact with the inclined sealing surfaces 520 through the folding of the wrap main body 100. In this process, the block protrusions 530 are engaged with the protrusion holders 540 so that close contact with the inclined sealing surfaces 520 and sealing can be achieved in the state in which unintended movement is prevented.

Meanwhile, a user may package food by superimposing another wrap 10, having the same size as the wrap 10, on the wrap 10.

In this case, the user may package the food by binding the wraps 10 in a superimposed state in such a manner as to couple the male seal 200 and female seal 300 of the wrap 10 with the female seal 300 and male seal 200 of the other wrap 10, respectively.

As discussed above, according to the improved press-fit structure 50 according to an embodiment and the food packaging wrap 10 using the same, the air inside the female seal 300 is discharged through the configurations of the air discharge portions 400 during the process of press-fitting the male seal 200, so that the male seal 200 can be smoothly and completely fastened in place without being pushed.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

The invention claimed is:

1. A press-fit structure for sealing fastened portions while detachably fastening a first member and a second member to each other, the press-fit structure comprising:
   a male seal protruding to a predetermined length on the first member;
   a female seal defined on the second member in a groove shape corresponding to the predetermined length of the male seal, the female seal being configured such that the male seal is press-fitted thereinto; and
   air discharge portions defined in portions of the male seal and configured to provide discharge paths for air inside the female seal during a process of press-fitting the male seal.

2. The press-fit structure of claim 1,
wherein the male seal comprises:
   a male base protruding from the first member while forming a width narrower than a width of a groove constituting a portion of the female seal; and
   one or more male blades protruding on at least one of both sides in a widthwise direction of the male base while forming blade shapes having a width corresponding to the width of the groove constituting the portion of the female seal, the one or more male blades being configured to come into close contact with side walls that form the groove of the female seal, and
wherein the air discharge portions comprise:
   one or more air discharge recesses defined in recess shapes in portions of the one or more male blades so that a the width of the one or more male blades is narrowed, the one or more air discharge recesses being configured to form one or more air discharge paths between the side walls that form the groove of the female seal.

3. The press-fit structure of claim 2, wherein:
the male blades are protruding on the both sides in the widthwise direction of the male base, and
the one or more air discharge recesses are defined on the one or more male blades on the both sides of the male base, and are symmetrical with respect to the male base.

4. The press-fit structure of claim 2, wherein:
the male blades are protruding on the both sides in the widthwise direction of the male base; and
the one or more air discharge recesses are defined on the one or more male blades on the both sides of the male base and are asymmetrical with respect to the male base.

5. The press-fit structure of claim 2, wherein the female seal comprises:
   a pair of female side walls extending in a state of being spaced apart at a predetermined interval to form the groove in a space, and configured to come into close contact with the male blades; and
   side wall hooks, each protruding from each of the pair of female side walls, and configured to be caught on the male blades.

6. The press-fit structure of claim 1, wherein the male seal extends while forming a curvature different from a curvature of the female seal.

7. The press-fit structure of claim 6, wherein the male seal extends while forming a curvature of an arch or wave shape repeated a plurality of times.

8. A food packaging wrap for packaging food in a sealed state, the food packaging wrap comprising:
   a wrap main body having a soft plate having a predetermined area and elasticity, configured to be folded, and configured to be folded while accommodating food or to surround food while being combined with another plate;
   a male seal protruding along a circumference of one half of one surface of the wrap main body;
   a female seal defined in a groove shape along a circumference of a remaining half of the one surface of the wrap main body, and configured such that the male seal is press-fitted and coupled thereinto by folding of the wrap main body, or configured such that another male seal defined in another wrap main body is press-fitted and coupled to the female seal; and
   air discharge portions defined in portions of the male seal, and configured to provide discharge paths for air inside the female seal during a process of press-fitting the male seal.

9. The food packaging wrap of claim 8,
wherein the male seal comprises:
   a male base protruding along one half of a circumference of one surface of the wrap main body while forming a width narrower than a width of a groove constituting a portion of the female seal; and
   one or more male blades protruding on at least one of both sides in a widthwise direction of the male base while forming blade shapes having a width corresponding to the width of the groove constituting a the portion of the female seal, the one or more male blades being configured to come into close contact with side walls forming the groove of the female seal, and wherein the air discharge portions comprise:

one or more air discharge recesses defined in recess shapes in portions of the one or more male blades so that the width of the one or more male blades is narrowed, the one or more air discharge recesses being configured to form one or more air discharge paths between the side walls that form the groove of the female seal.

10. The food packaging wrap of claim 9, wherein the female seal comprises:

a pair of female side walls extending along the remaining half of the circumference of the one surface of the wrap main body in a state of being spaced apart at a predetermined interval to form the groove in a space, the pair of female side walls being configured to come into close contact with the one or more male blades; and side wall hooks, each protruding from each of the pair of female side walls, and configured to be caught on the one or more male blades.

11. The food packaging wrap of claim 8, wherein:

the female seal extends with a curvature of an arc shape corresponding to the circumference of the remaining half of the wrap main body; and the male seal extends along the circumference of the one half of the wrap main body while forming a curvature of an arch or wave shape.

12. The food packaging wrap of claim 8, further comprising:

foldable sealing portions disposed in boundary portions between the male seal and the female seal and configured to seal folded portions when the wrap main body is folded.

13. The food packaging wrap of claim 12, wherein each of the foldable sealing portions comprises:

a sealing block protruding in each of the boundary portions between the male seal and the female seal while forming a trapezoidal section; and inclined sealing surfaces defined as inclined surfaces at ends of the male seal and the female seal, and configured to come into close contact with the sealing block when the wrap main body is folded.

14. The food packaging wrap of claim 13, wherein each of the foldable sealing portions further comprises:

block protrusions protruding from a top of the sealing block, and configured to provide catch portions; and protrusion holders defined in recess shapes on the inclined sealing surfaces, and configured to accommodate the block protrusions.

* * * * *